Dec. 5, 1944.

T. A. RICH 2,364,474

DIRECT CURRENT MEASUREMENT

Filed Sept. 21, 1943

Inventor:
Theodore A. Rich,
by Harry E. Dunham
His Attorney.

Patented Dec. 5, 1944

2,364,474

UNITED STATES PATENT OFFICE 2,364,474

DIRECT CURRENT MEASUREMENT

Theodore A. Rich, Schenectady, N. Y., assignor to General Electric Company, a corporation of New York Application September 21, 1943, Serial No. 503,229

5 Claims. (Cl. 171—95)

My invention relates to a method and apparatus for measuring direct current and it is particularly adapted to the accurate measurement of high values of direct current without the use of a calibrated current shunt. The apparatus required of my invention has a fraction of the weight and cost of a current shunt suitable for measuring an equivalent current, and my invention does not require the cutting or otherwise opening of the high current circuit for the purpose of inserting a shunt.

In carrying my invention into effect, I provide a flux responsive instrument which is placed in the field of the direct current bus or cable in which the current is to be measured. This instrument is provided with a winding for producing a flux which opposes the bus field flux therein. The small current through such winding necessary to nullify the influence of the bus flux on the instrument is proportional to the bus current, and hence, can be measured in terms of the bus current. Automatic current regulating means is used to control the nullifying flux current of the instrument. Such regulating means is subject to a fine control from control contacts on the flux responsive instrument and to a coarse control which involves comparing the nullifying flux current with the voltage drop across a section of the bus.

Figure 1:
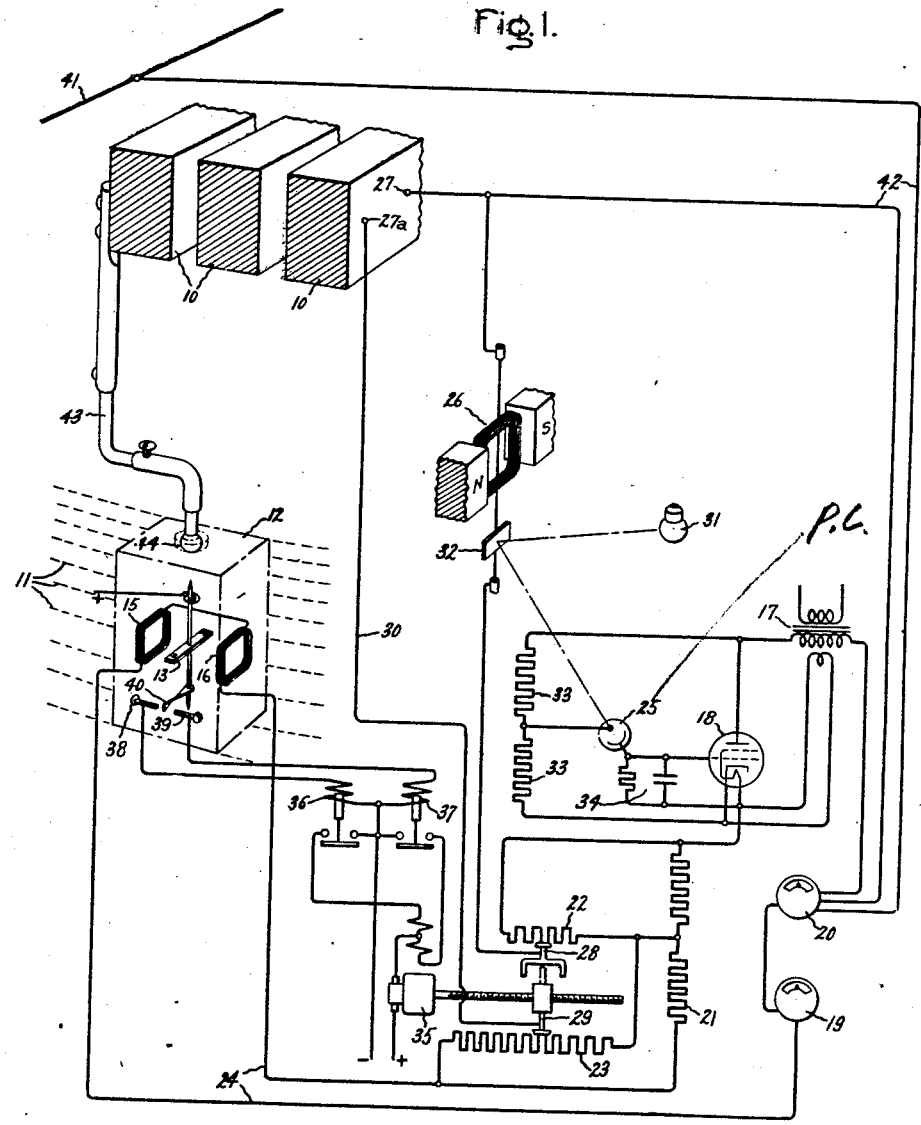
Figure 2:
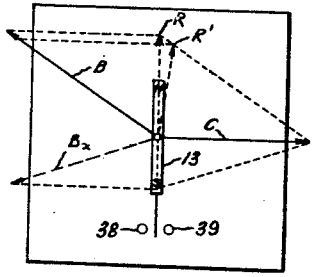

The features of my invention which are believed to be novel and patentable will be pointed out in the claims appended hereto. For a better understanding of my invention, reference is made in the following description to the accompanying drawing in which Fig. 1 illustrates a schematic view of apparatus and circuit connections which may be used in carrying out the invention. Fig. 2 represents the effect of different oriented conditions of the flux responsive instrument relative to the bus, a feature which is utilized for calibration purposes.

Referring to Fig. 1, the stranded bus structure or conductor 10 represents one side or line of a direct current circuit capable of carrying a large current, such for example as 50,000 amperes. The high magnitude of the current to be measured is not a limitation of my invention. The bus 10, because of its size, is made in sections for mechanical reasons but whatever current is flowing is assumed to divide approximately in the same proportion in the several sections for all values of total current.

When current flows in bus 10, a flux is set up about it as represented at 11, which for any given point in the vicinity of the bus is proportional to the bus current. Supported at a selected position in such flux field is an instrument 12 which carries a small bar-shaped polarized needle 13 generally similar to a compass needle. The needle or armature 13 is freely pivoted on an axis which is fixed with respect to the base of the instrument 12 and which axis has an angle with respect to the direction of the bus flux field in which the armature is located, such that the armature tends to turn and so far as possible align itself with such flux field. The most sensitive orientation of the instrument with respect to the field is that where the axis of rotation of the armature 13 is at right angles to the bus flux field. The instrument is provided with a stationary winding comprising coils 15 and 16 which, when energized with direct current, also produces a field in the immediate vicinity of the armature 13 and at right angles to its axis of rotation, and according to my invention, the field produced by such winding is made to oppose and nullify the bus field in the immediate vicinity of the armature 13. The current in coils 15 and 16 which is just sufficient to nullify the bus flux field is then proportional to the current flow in bus 10, and the apparatus may be calibrated to measure such current.

Current is supplied to coils 15 and 16 through wires 24 from a transformer 17 through a rectifying and controlling vacuum tube 18. This current circuit 24 includes an ammeter 19, the current coil of a watt or watthour meter 20, or both, and a resistance potentiometer comprising a resistance 21 having a resistance 22 connected in parallel with one section and a resistance 23 in parallel with another section thereof.

The grid bias of tube 18 is controlled by a light sensitive cell 25 and a mirror galvanometer 26 which is preferably a flux meter and is responsive to the differential voltage drop across a section of the direct current bus 10 and selected parts of the resistances 22 and 23. The galvanometer circuit may be traced from a connection 27 on the bus 10 through the galvanometer, represented as of the suspended coil type, to an adjustable tap 28 on resistance 22, an adjustable tap 29 on resistance 23, wire 30, back to a point 27a of the bus 10. The current through the galvanometer 26 is due to the voltage drop across the points 27—27a of the bus less the voltage drop across the taps 28 and 29. Light is reflected from a light source 31 by the galvanometer mirror 32 to the photocell 25. The photocell is connected between the control grid of tube 18 and a suitable point on a resistance 23 connected between the cathode and plate of tube 18. A grid leak 34 is connected between the grid and cathode of the tube, and the cathode of the tube is heated by a secondary coil for that purpose on transformer 17. The tap 28 is for coarse adjustment and within limits may be manually adjusted and both taps 28 and 29 are automatically adjustable by a reversible pilot motor 35 controlled either directly or through relays 36 and 37 from stationary contacts 38 and 39 of the flux responsive element 12 which carries a cooperating contact 40 on its moving element. There is lost motion in the adjusting mechanism of tap 28. The apparatus may be adjusted and calibrated as follows: Let it be assumed that with 50,000 amperes flowing in bus 10, we desire five amperes of current in circuit 24. First, we so position the flux responsive element 12 relative to bus 10 that when five amperes are flowing in coils 15 and 16, the field produced by such coils just neutralizes the influence of flux 11 on the magnetized needle or flux responsive element, so that the needle armature and contact member 40 stand in a neutral position between the contacts 38 and 39, as represented. This instrument has a spiral spring contact lead to the moving element that produces a very slight bias when moved from such a position; however, such a spring bias is not essential. Second, the fluxmeter galvanometer 26 control of tube 18 is so adjusted that with 50,000 amperes flowing in bus 10, the voltage drop across points 27—27a less the voltage drop between taps 28 and 29 is such as to yield a deflection of galvanometer 26; such that the light on photocell 25 is such as to cause five amperes to flow in the tube circuit 24. At such time the voltages 27—27a and 28—29 are equal if a true fluxmeter is used, as it has no restoring torque. The adjustment of tap 28 manually may be helpful in making such adjustment. Further, the direction of deflection of fluxmeter galvanometer 26 is such that a decrease in voltage drop across points 27—27a reduces the bias on tube 18 and the current flow in circuit 24. The connections of motor 35 are such that if the current in coils 15 and 16 fails to nullify the flux 11, the flux responsive element 12 will deflect and close the contact, for example contact 38, to operate tap 29 to the right, reducing the voltage which opposes the voltage drop across 27—27a, thereby increasing the deflection of fluxmeter 26 and the current flow in tube circuit 24 until the contact 40 of the fluxmeter returns to the neutral position and the voltage 29—28 due to the increased current in 20—21 equals voltage 27—27a. Some initial adjustment of the spacing between points 27 and 27a may also be desirable to bring the operation of the system within the desired range. Once the system is properly adjusted and calibrated, it is seen that the adjustment of the contact 29 and possibly also contact 28 in response to the deflections of the fluxmeter serves to keep the shunt, comprising the bus section across which taps 27 and 31 are connected, calibrated. For instance, if the voltage drop across points 27 and 27a increases due to heating of the bus rather than an increase in bus current, this will cause instrument 26 to deflect to increase the current in circuit 24 which will cause the control to function to move contact 29 to the left to increase the voltage which opposes that across points 27—27a until the calibrated condition is restored.

The apparatus will function automatically to maintain a current in tube circuit 24 proportional to the bus flux 11 which is of course proportional to the current in bus 10. Hence, such current can be measured on the ammeter 19 in terms of the bus current with high accuracy. At 41, I have represented the other side of the direct current bus circuit by a single line to include in the disclosure a voltage connection so as to measure the wattage in the bus. Twenty (20) represents a watt measuring instrument or meter energized by the calibrated current of tube circuit 24 and also by a voltage over leads 42. Any number of instruments, meters, and relays may be energized by the calibrated current in circuit 24. In the calibration of the apparatus, it may be desirable to move the flux responsive element towards or away from the bus, and a telescoping adjustable support 43, which should be made of nonmagnetic material, is represented for securing the flux responsive element in adjustable fixed relation with respect to the bus. Also, I have represented a universal pivot connection 44 between the flux responsive element and supporting rod 43, also useful for calibrating adjustment purposes.

In Fig. 1 let it be assumed that the axis of rotation of the flux responsive needle is at right angles to the direction of the bus flux therethrough, and that the flux axis of the coils 15 and 16 is parallel to the bus flux. The bus flux and coil flux will therefore be in line with each other but opposed. In such condition the two fluxes, when equal in the vicinity of the armature needle, will have equal influences on the needle for all needle positions.

If the flux responsive element is turned so that the component of the bus field B, Fig. 2, no longer directly opposes the coil field C and the north pole of the magnet 13 is between the obtuse angle of the vectors representing the partially opposing fields a change in one field with respect to the other will produce a rotation of the resultant vector as from R to R'. The compass needle will follow the rotating resultant vector freely within the limits of the contact spacing. It can maintain a stable position between the gaps and if mechanically deflected from its alignment with the resultant vector, it will experience a restoring torque proportional to the sine of the angle between it and the resultant vector. The needle acts as if it were being held in place by a spring. This is the normally desirable operating condition. If the angle formed by the bus field and the coil field is reflex with respect to the magnet north pole, for example where the instrument is turned so that $B_x$ represents the bus field component, then it can be shown that the needle cannot exist in stable equilibrium between the contacts, unless provided with a spring, and its response to relative field changes is in the nature of a toggle snap action. Thus the needle if disturbed would try to turn 180 degrees from the position shown to line up with the resultant of $B_x$ and C. In this condition the compensation is practically continuous and in some situations this may be desirable. When the most desirable position has been found and the apparatus calibrated, the flux responsive element should remain in a fixed position relative to the bus, and other devices and conditions which might disturb the bus flux field distribution in the vicinity of the flux responsive element should not be disturbed. As shown in Fig. 1 the flux responsive instrument 12 has no magnetic circuit but is of the air core type, and hence, the angular direction of the flux 11 therethrough may be altered with respect to the field produced by the coils 15, 16 and with respect to the axis of the magnetic armature 13 by orienting the instrument in the field 11 as described above.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. Current measuring apparatus comprising in combination with a direct current conductor carrying the current to be measured, an air core flux responsive instrument positioned directly in the leakage flux field of such conductor such as to be influenced by such field flux in proportion to the current flow in the conductor, said instrument having a winding for producing a second flux in said instrument, a circuit for energizing said winding in a direction such that the influence of the two fields on said instrument is opposed, means for regulating the current flow in said circuit including means controlled by said instrument in response to the differential field of said instrument for maintaining the influence of said fields on the instrument equalized, and means for measuring the current in said regulated circuit in terms of the current flow in said conductor.

2. Apparatus for measuring direct current including a conductor carrying the current to be measured, an air core flux responsive instrument positioned within the influence of the leakage flux field of said conductor, a winding on said instrument for producing a second field influencing said instrument, a circuit for energizing said winding such that the influence of the two fields on the instrument is opposed, means subject to the voltage drop across a length of said conductor for regulating the current in said circuit, means controlled in response to the differential field of said instrument for calibrating such regulation means to maintain the influence of the two fields acting on said instrument substantially equalized, and means for measuring the current flow in said circuit in terms of the current flow in said conductor.

3. Current metering apparatus comprising in combination with a conductor carrying the current to be measured, a flux responsive instrument positioned in the field of said conductor so as to be influenced thereby, a winding for producing a second field in said instrument, a metering circuit for energizing said winding so that the influence of the two fields on the instrument is opposed, a deflection type instrument connected in a shunt circuit across a section of said conductor for regulating the current in said metering circuit and maintaining it proportional to the deflection of said shunt connected instrument, said shunt circuit including a resistance potentiometer in the metering circuit which introduces a voltage in the shunt circuit opposed to the voltage drop across the conductor section, and means controlled by the flux responsive instrument for adjusting the voltage introduced into the shunt circuit by the potentiometer, decreasing said voltage when the field of said conductor predominates in the influence of the flux responsive instrument and vice versa.

4. In a current measuring system a bus structure carrying the current to be measured, an air core differential flux responsive instrument having a magnetic armature, means for supporting said instrument in adjustable fixed relation to said bus structure such that the spacing between said instrument and bus structure may be varied to vary the intensity of the bus field in the instrument for a given bus current, and to universally orient the instrument relative to said bus structure to vary the direction of the bus field through the instrument, said instrument having winding means for producing a field in a fixed direction through the instrument regardless of the orientation of said instrument relative to the bus structure.

5. Current measuring apparatus comprising in combination with a direct current conductor which carries the current to be measured, a flux responsive instrument positioned within the flux field of said conductor, a winding on said instrument for producing a second flux in said instrument, a metering circuit for energizing said winding in such direction as to oppose the influence of the conductor field on said instrument, a vacuum tube regulator for controlling the current flow in said metering circuit, a mirror fluxmeter connected in a shunt circuit across a section of said conductor, light sensitive means for controlling the operation of said vacuum tube and controlled in response to the deflection of said mirror fluxmeter to maintain the current flow in the metering circuit proportional to the deflection of said fluxmeter, a resistance potentiometer in the metering circuit connected to the shunt fluxmeter circuit so as to introduce into said fluxmeter circuit a voltage which is substantially equal and opposes the voltage across the conductor section, and relay means controlled by said flux responsive instrument for adjusting the resistance potentiometer to decrease and increase the voltage introduced by it into the shunt fluxmeter circuit according as the conductor flux or the second flux predominates on the influence of the flux responsive instrument.

THEODORE A. RICH.